US012442142B2

(12) United States Patent
Norton et al.

(10) Patent No.: US 12,442,142 B2
(45) Date of Patent: Oct. 14, 2025

(54) HOSE BRIDGE EXTENDER AND RAILROAD CROSSING

(71) Applicant: Cleveland Reclaim Industries, Inc., Lorain, OH (US)

(72) Inventors: Tom Norton, Bay Village, OH (US); Robert Mestdagh, Ackley, IA (US); Dennis R Hildebrandt, Jr., North Olmsted, OH (US); Michael W Jackson, Wooster, OH (US)

(73) Assignee: Cleveland Reclaim Industries, Inc., Lorain, OH (US)

( * ) Notice: Subject to any disclaimer, the term of this patent is extended or adjusted under 35 U.S.C. 154(b) by 904 days.

(21) Appl. No.: 17/515,672

(22) Filed: Nov. 1, 2021

(65) Prior Publication Data

US 2022/0049434 A1 Feb. 17, 2022

Related U.S. Application Data

(63) Continuation of application No. 29/643,276, filed on Apr. 6, 2018, now Pat. No. Des. 935,056, which is a continuation of application No. 29/584,435, filed on Nov. 15, 2016, now Pat. No. Des. 815,306, which is a continuation of application No. 29/522,823, filed on Apr. 2, 2015, now Pat. No. Des. 772,431.

(51) Int. Cl.

*E01C 9/04* (2006.01)
*A62C 33/06* (2006.01)
*E01B 7/28* (2006.01)
*E01C 11/22* (2006.01)

(52) U.S. Cl.

CPC ................ *E01C 9/04* (2013.01); *A62C 33/06* (2013.01); *E01B 7/28* (2013.01); *E01C 11/222* (2013.01)

(58) Field of Classification Search

CPC . E01C 9/04; E01C 11/222; E01B 7/28; H02G 9/04

USPC .......................................................... 104/275

See application file for complete search history.

(56) References Cited

U.S. PATENT DOCUMENTS

| | | | | | |
|---|---|---|---|---|---|
| 1,116,421 | A * | 11/1914 | Hart et al. | E01C 9/04 | 238/8 |
| 1,710,030 | A * | 4/1929 | Pearson | E01C 9/04 | 238/8 |
| 4,093,120 | A * | 6/1978 | Canfield | E01C 9/04 | 404/66 |
| D254,450 | S | 3/1980 | Pulse | | |
| 4,365,743 | A * | 12/1982 | Trickel | E01C 9/04 | 404/34 |
| D298,464 | S | 11/1988 | Roote | | |
| 4,846,401 | A * | 7/1989 | Kennel | E01C 9/04 | 238/7 |
| D314,240 | S | 1/1991 | Scheiwiller | | |

(Continued)

FOREIGN PATENT DOCUMENTS

KR 970002852 B1 * 3/1997 ............... E01C 9/04

OTHER PUBLICATIONS

KR 970002852 with machine translation (Year: 1997).*

*Primary Examiner* — Zachary L Kuhfuss

(74) *Attorney, Agent, or Firm* — Calfee, Halter & Griswold LLP

(57) ABSTRACT

A bridge piece that can be used as a hose bridge extender or a railroad crossing. An exemplary bridge piece has a body having an undercut proximate one side, which undercut is positioned near a track when used as part of a railroad crossing.

20 Claims, 5 Drawing Sheets

(56) References Cited

U.S. PATENT DOCUMENTS

| | | | | | |
|---|---|---|---|---|---|
| 5,439,625 | A | * | 8/1995 | Schmidt | E01C 5/18<br>264/912 |
| 5,465,903 | A | * | 11/1995 | Davis | E01B 21/00<br>404/41 |
| 5,535,948 | A | * | 7/1996 | Williams | E01B 2/00<br>238/8 |
| 5,777,266 | A | | 7/1998 | Herman | |
| D414,276 | S | | 9/1999 | Bruno | |
| D418,818 | S | | 1/2000 | Henry | |
| D435,304 | S | | 12/2000 | Rainey | |
| 6,202,565 | B1 | | 3/2001 | Henry | |
| 6,287,047 | B1 | | 9/2001 | Dufresne | |
| D463,041 | S | | 9/2002 | Dice | |
| 6,508,041 | B1 | | 1/2003 | Boot | |
| 6,878,881 | B1 | | 4/2005 | Henry | |
| 7,037,037 | B1 | | 5/2006 | Smith | |
| D567,913 | S | | 4/2008 | Norton | |
| 8,678,704 | B1 | | 3/2014 | Smith | |
| D725,748 | S | | 3/2015 | Lake | |
| D772,431 | S | | 11/2016 | Norton | |
| 9,512,582 | B2 | | 12/2016 | Hill | |
| D815,306 | S | | 4/2018 | Norton | |
| D844,757 | S | * | 4/2019 | Norton | D23/259 |
| D935,056 | S | | 11/2021 | Norton | |
| 2002/0078513 | A1 | | 6/2002 | Schouest | |
| 2010/0303555 | A1 | | 12/2010 | Herse | |

* cited by examiner

HOSE BRIDGE EXTENDER AND RAILROAD CROSSING

CROSS-REFERENCE TO RELATED CASES

This case is a continuation of U.S. patent application Ser. No. 29/643,276, filed Apr. 6, 2018, now U.S. Pat. No. D935,056, issued Nov. 2, 2021, is a continuation of U.S. patent application Ser. No. 29/584,435, filed Nov. 15, 2016 now U.S. Pat. No. D815,306, issued Apr. 10, 2018, which is a continuation of U.S. patent application Ser. No. 29/522,823, filed Apr. 2, 2015, now U.S. Pat. No. D772,431, issued Nov. 22, 2016, the entire disclosures of all of which are hereby incorporated by reference in their entireties.

BACKGROUND

Hose bridge extensions are known, e.g., U.S. Pat. No. D552,217 to Norton.

SUMMARY

An exemplary bridge piece can be used as either a hose bridge extender or a railroad crossing.

An exemplary bridge piece comprises a body having an undercut proximate one side, which undercut is positioned near a track when used as part of a railroad crossing; the body having second, third, and fourth sides having interlocking structures to interlock with like bridge pieces.

An exemplary method comprises providing a one or a plurality of bridge pieces capable of being a hose bridge extender or a railroad crossing; and installing the one or plurality of bridge pieces as either a hose bridge extender between other hose bridge pieces or as a railroad crossing.

An Appendix consists of the parent U.S. Ser. No. 29/643,276, filed Apr. 6, 2018.

DETAILED DESCRIPTION

Figure 1:
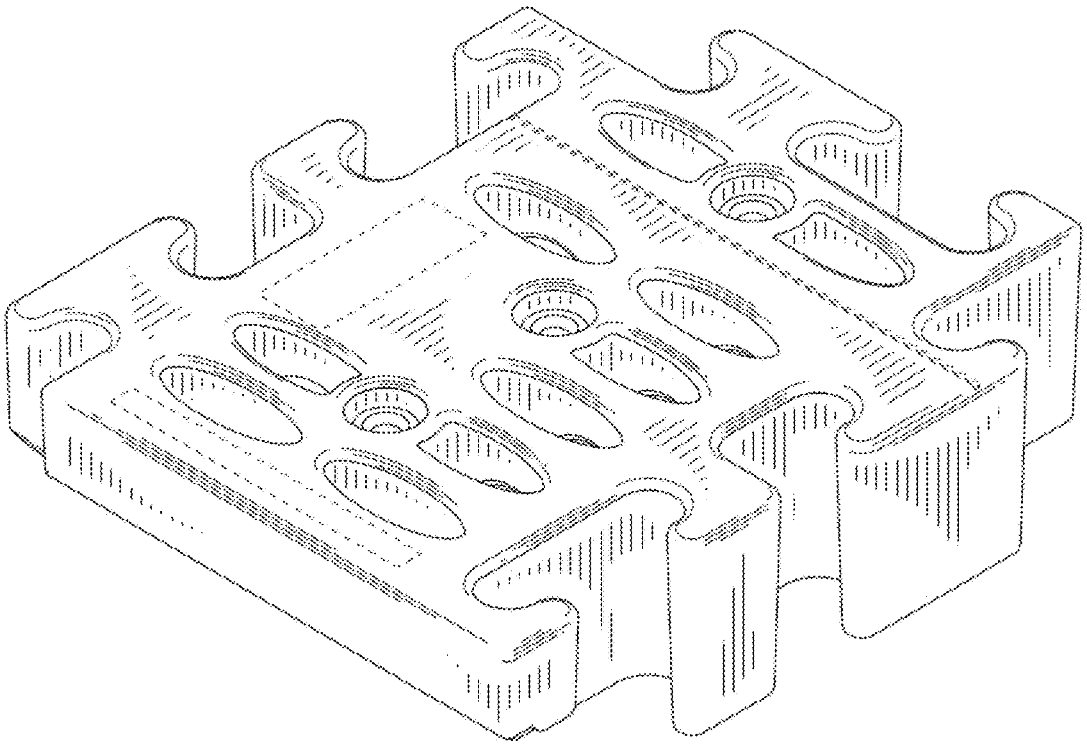
FIGS. 1-3 show an exemplary bridge piece.
Figure 2:
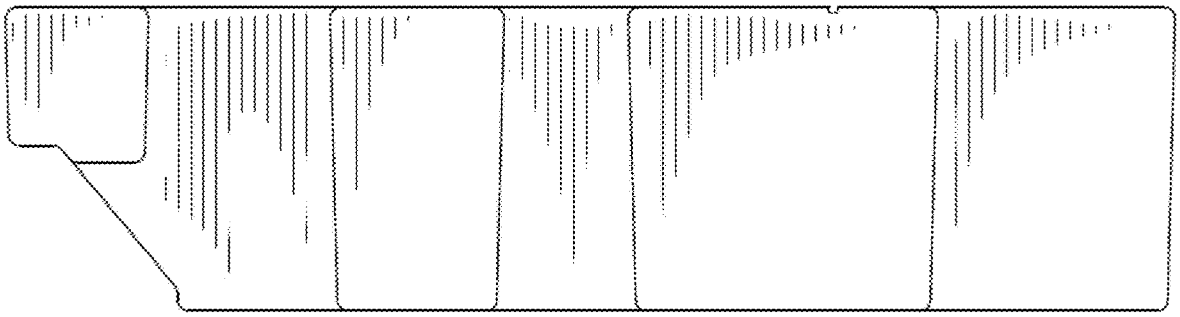
Figure 3:
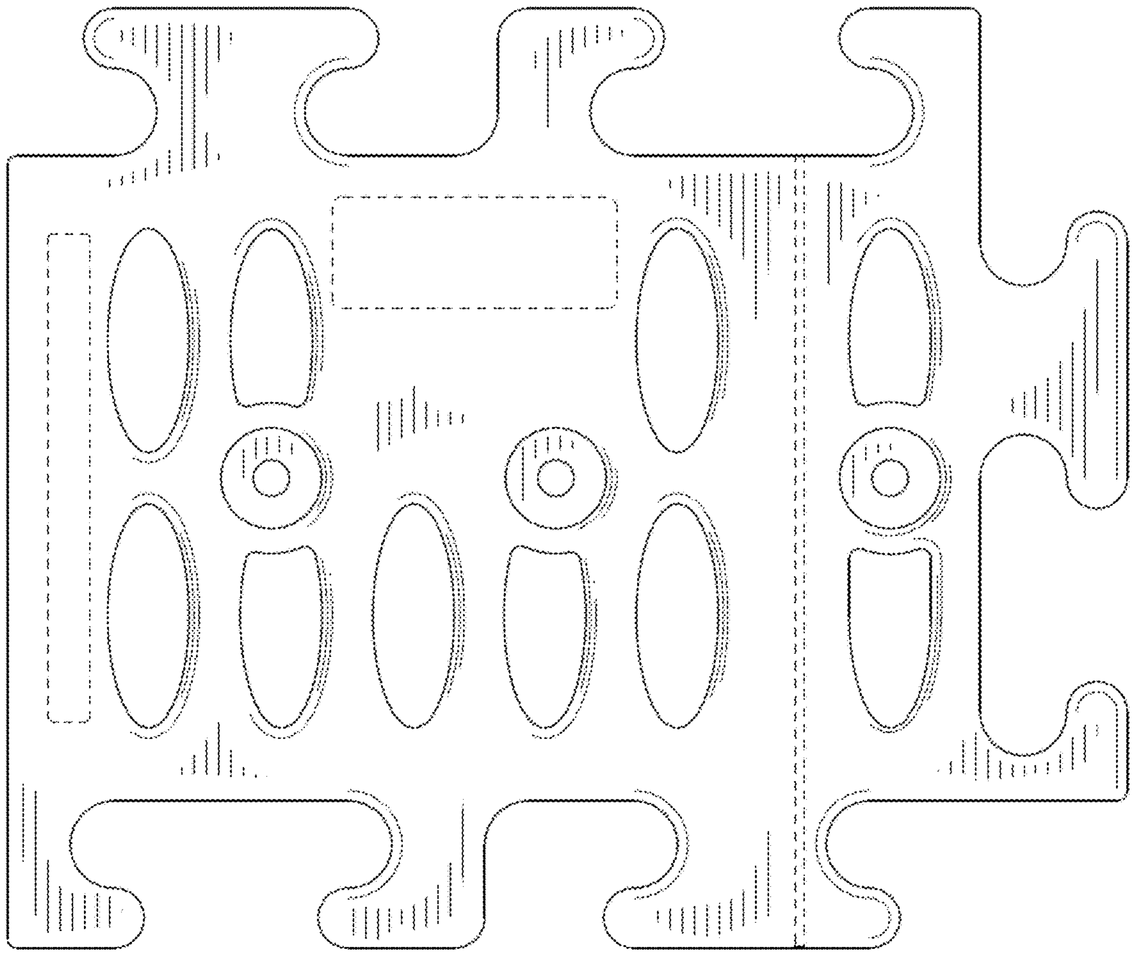
Figure 4:
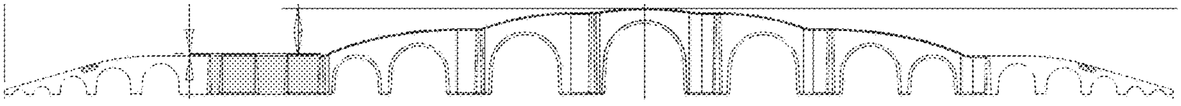
FIG. 4 shows the bridge piece of FIGS. 1-3 used as a hose bridge extender.

FIGS. 1-3 show an exemplary bridge piece that can be used as a hose bridge extender or a railroad crossing. FIG. 4 shows the bridge piece of FIGS. 1-3 used as a hose bridge extender.

Figure 5:
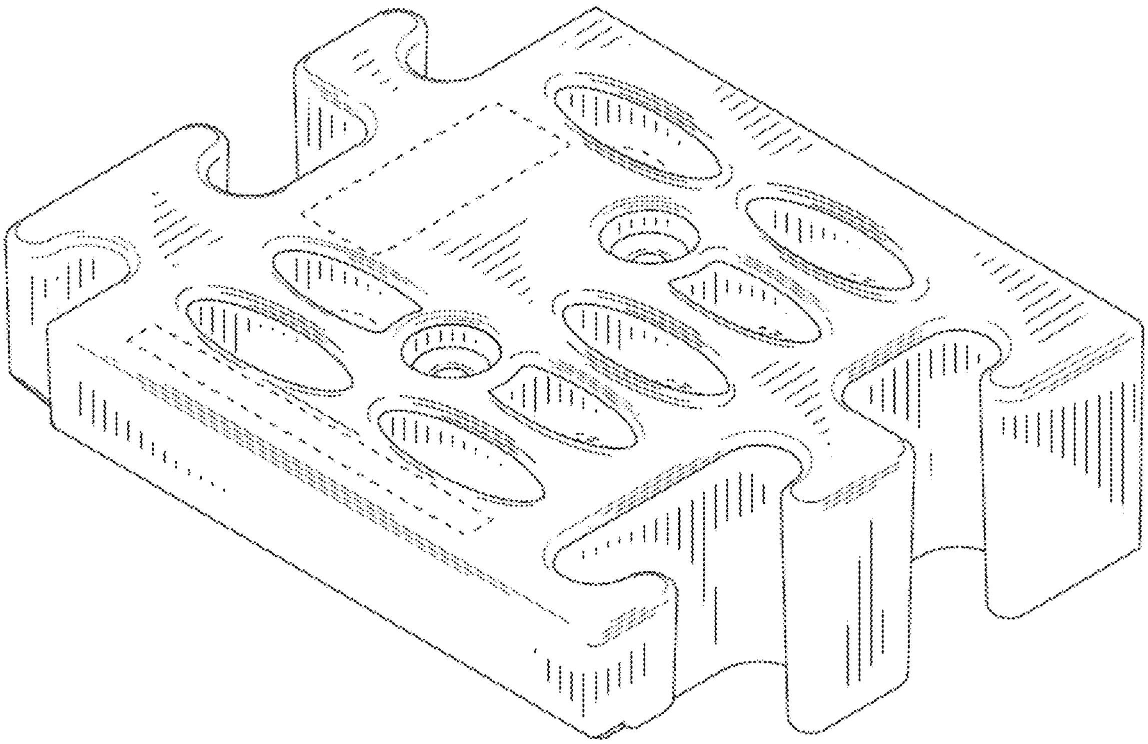
FIGS. 5-6 shows the bridge piece of FIGS. 1-3 with a portion cut off.
Figure 6:
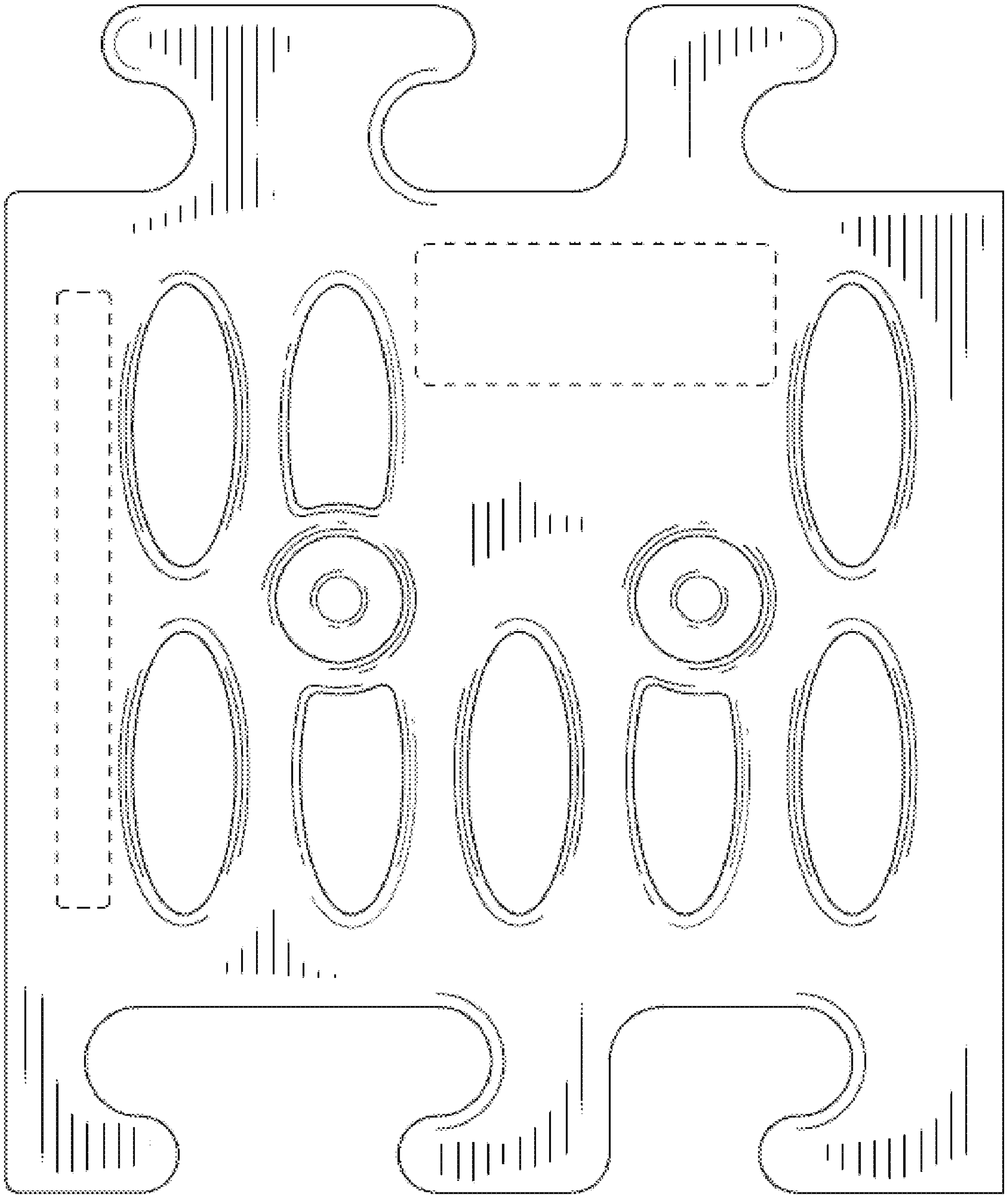

FIGS. 5-6 shows the bridge piece of FIGS. 1-3 with a portion cut off.

Figure 7:
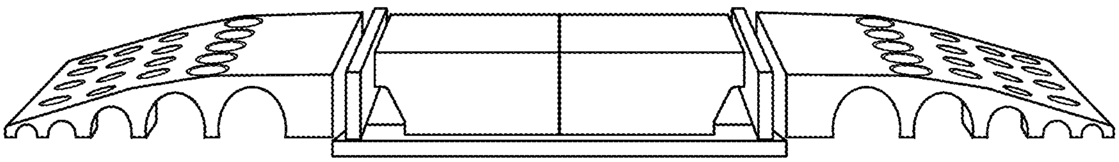
FIG. 7 shows two of the cut bridge pieces of FIGS. 5-6 end to end.
Figure 8:
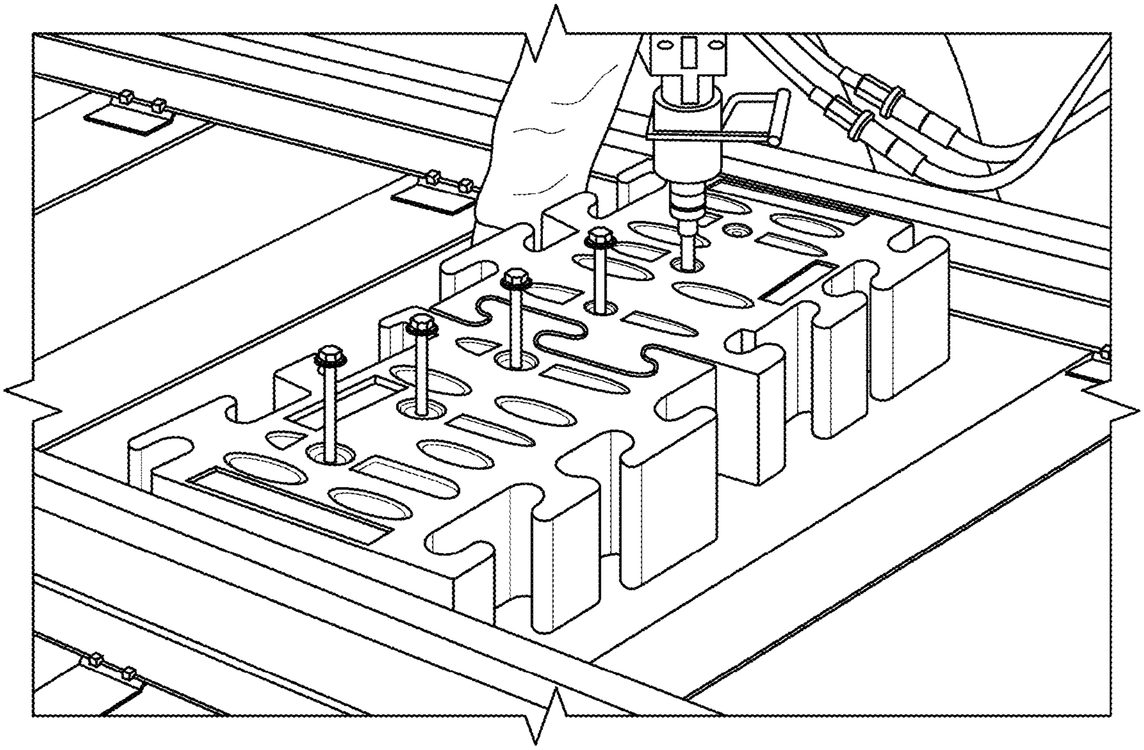
FIG. 8 shows two bridge pieces being installed.

FIG. 7 shows two of the cut bridge pieces of FIGS. 5-6 end to end to form a railroad crossing. FIG. 8 shows two bridge pieces being installed as a railroad crossing.

An exemplary bridge piece comprises a body having an undercut proximate one side, which undercut is positioned near a track when used as part of a railroad crossing; the body having second, third, and fourth sides having interlocking structures to interlock with like bridge pieces. An exemplary bridge piece has a body having an undercut proximate one side, which undercut is positioned near a track when used as part of a railroad crossing.

An exemplary method comprises providing a one or a plurality of bridge pieces capable of being a hose bridge extender or a railroad crossing; and installing the one or plurality of bridge pieces as either a hose bridge extender between other hose bridge pieces or as a railroad crossing. When installing as a railroad crossing, the undercut portion is positioned near a track.

In exemplary embodiments, the bridge piece is molded.

What is claimed is:

1. A method of forming a railroad crossing, comprising:

(a) providing a plurality of hose bridge extenders capable of being used as a hose bridge extender or a railroad crossing, comprising:

a body;

the body having outwardly extending projections on opposite first and second sides, with gaps between the outwardly extending projections defining cavities to receive outwardly extending projections of like bridge pieces;

a third side having outwardly extending projections, with gaps between the outwardly extending projections defining cavities to receive outwardly extending projections of like bridge pieces; and wherein a shape of the cavities corresponds to a shape of outwardly extending projections of like bridge pieces to interlock with other bridge pieces; and (b) positioning the plurality of hose bridge extenders between tracks;

wherein the plurality of hose bridge extenders is positioned side by side between the tracks with their respective projections and cavities interlocked; and (c) installing the plurality of hose bridge extenders as a railroad crossing between the tracks.

2. The method of forming a railroad crossing according to claim 1, wherein step (b) comprises positioning the plurality of the hose bridge extenders between the tracks end to end extending longitudinally with the tracks with their respective projections and cavities interlocked.

3. The method of forming a railroad crossing according to claim 2, wherein step (c) comprises securing in place the plurality of the hose bridge extenders using fasteners.

4. The method of forming a railroad crossing according to claim 2, wherein each hose bridge extender of the plurality of hose bridge extenders has a fourth side opposite the third side, the fourth side having an upper portion that projects away from the body farther than a lower portion and further wherein step (b) comprises positioning the at least one hose bridge extender between tracks with the fourth side proximate a track.

5. The method of forming a railroad crossing according to claim 1, wherein step (c) comprises securing in place the at least one hose bridge extender using fasteners.

6. The method of forming a railroad crossing according to claim 5, wherein the fasteners used to secure in place the at least one hose bridge extender comprise threaded fasteners.

7. The method of forming a railroad crossing according to claim 5, wherein the fasteners used to secure in place the at least one hose bridge extender comprise spikes.

8. The method of forming a railroad crossing according to claim 1, wherein the at least one hose bridge extender has a fourth side opposite the third side, the fourth side having an upper portion that projects away from the body farther than a lower portion and further wherein step (b) comprises positioning the at least one hose bridge extender between tracks with the fourth side proximate a track.

9. The method of forming a railroad crossing according to claim 1, the outwardly extending projections and cavities of the hose bridge extender configured to be lowered vertically into engagement with an adjacent hose bridge extender.

10. A method of forming a railroad crossing, comprising:

(a) providing first and second pluralities of the hose bridge extenders capable of being a hose bridge extender or a railroad crossing, comprising;

a body;

the body having outwardly extending projections on opposite first and second sides, with gaps between the outwardly extending projections defining cavities to receive outwardly extending projections of like bridge pieces; and wherein a shape of the cavities corresponds to a shape of outwardly extending projections of like bridge pieces to interlock with other bridge pieces; and wherein the hose bridge extenders of the first and second pluralities of the hose bridge extenders further include a third side having outwardly extending projections, with gaps between the outwardly extending projections defining cavities to receive outwardly extending projections of like bridge pieces;

(b) (i) positioning the first plurality of the hose bridge extenders between the tracks adjacent a first track end to end extending longitudinally with the first track with their respective projections and cavities interlocked and (ii) positioning the second plurality of the hose bridge extenders between the tracks adjacent a second track end to end extending longitudinally with the second track with their respective projections and cavities interlocked, and (iii) and wherein the hose bridge extenders of the first and second pluralities of the hose bridge extenders have their respective projections and cavities interlocked with an adjacent hose bridge extender;

(c) installing the first and second pluralities of hose bridge extenders as a railroad crossing between the tracks.

11. The method of forming a railroad crossing according to claim 10, wherein each hose bridge extender of the first and second pluralities of the hose bridge extenders has a fourth side opposite the third side, the fourth side having an upper portion that projects away from the body farther than a lower portion and further wherein step (b) comprises positioning the at least one hose bridge extender between tracks with the fourth side proximate a track.

12. A bridge piece capable of being a hose bridge extender or a railroad crossing, comprising:

a body;

the body having outwardly extending projections on opposite first and second sides, with gaps between the outwardly extending projections defining cavities to receive outwardly extending projections of like bridge pieces;

wherein a shape of the cavities corresponds to a shape of outwardly extending projections of like bridge pieces to interlock with other bridge pieces;

a third side having outwardly extending projections, with gaps between the outwardly extending projections defining cavities to receive outwardly extending projections of like bridge pieces; and a fourth side opposite the third side, the fourth side having an upper portion that projects away from the body farther than a lower portion.

13. The bridge piece according to claim 12, further comprising at least one hole extending through the body used for securing the bridge piece in place.

14. A bridge piece capable of being a hose bridge extender or a railroad crossing, comprising:

a body;

the body having outwardly extending projections on opposite first and second sides, with gaps between the outwardly extending projections defining cavities to receive outwardly extending projections of like bridge pieces;

wherein a majority of the body is the same thickness;

wherein a shape of the cavities corresponds to a shape of outwardly extending projections of like bridge pieces to interlock with other bridge pieces; and a third side having outwardly extending projections, with gaps between the outwardly extending projections defining cavities to receive outwardly extending projections of like bridge pieces.

15. The bridge piece according to claim 14, further comprising a fourth side opposite the third side, the fourth side having an upper portion that projects away from the body farther than a lower portion.

16. The bridge piece according to claim 14, the outwardly extending projections and cavities of the hose bridge extender configured to be lowered vertically into engagement with an adjacent hose bridge extender.

17. A method of forming a railroad crossing, comprising:

(a) providing at least one hose bridge extender capable of being used as a hose bridge extender or a railroad crossing, comprising:

a body;

the body having outwardly extending projections on opposite first and second sides, with gaps between the outwardly extending projections defining cavities to receive outwardly extending projections of like bridge pieces; and wherein a shape of the cavities corresponds to a shape of outwardly extending projections of like bridge pieces to interlock with other bridge pieces; and (b) positioning the at least one hose bridge extender between rails of tracks, the rails having a base, a web, and a head;

wherein the at least one hose bridge extender is disposed with a gap between the rail head and web and the hose bridge extender when viewed from above, said gap configured such that said hose bridge extender does not extend below the rail head; and (c) installing the at least one hose bridge extender as a railroad crossing between the rails.

18. The method of forming a railroad crossing according to claim 17, wherein the at least one hose bridge extender has a fourth side opposite the third side, the fourth side having an upper portion that projects away from the body farther than a lower portion and further wherein step (b) comprises positioning the at least one hose bridge extender between tracks with the fourth side proximate a track.

19. The method of forming a railroad crossing according to claim 17, the outwardly extending projections and cavities of the hose bridge extender configured to be lowered vertically into engagement with an adjacent hose bridge extender.

20. The method of forming a railroad crossing according to claim 19, wherein the at least one hose bridge extender has a fourth side opposite the third side, the fourth side having an upper portion that projects away from the body farther than a lower portion and further wherein step (b) comprises positioning the at least one hose bridge extender between tracks with the fourth side proximate a track.

* * * * *